_United States Patent_ [19]

Rice et al.

[11] Patent Number: 4,806,615

[45] Date of Patent: Feb. 21, 1989

[54] REACTION INJECTION MOLDED ELASTOMERS PREPARED FROM AMINE TERMINATED POLYETHERS, A BLEND OF AN AROMATIC AMINE TERMINATED CHAIN EXTENDER, A SUBSTITUTED ACYCLIC ALIPHATIC AMINE TERMINATED CHAIN EXTENDER AND AN AROMATIC POLYISOCYANATE

[75] Inventors: Doris M. Rice, Austin; Robert A. Grigsby, Jr., Georgetown; Richard J. G. Dominguez, Austin, all of Tex.

[73] Assignee: Texaco Inc., White Plains, N.Y.

[21] Appl. No.: 56,036

[22] Filed: Jun. 1, 1987

[51] Int. Cl.[4] .................... C08G 18/10; C08G 18/32; C08G 18/30

[52] U.S. Cl. ........................................ 528/68; 528/64; 528/76; 528/77

[58] Field of Search .................. 528/64, 68, 76, 77

[56] References Cited

U.S. PATENT DOCUMENTS

| | | | |
|---|---|---|---|
| 3,523,918 | 8/1970 | Gonzalez | 428/318.8 |
| 3,838,076 | 9/1974 | Moss et al. | 521/164 |
| 4,218,543 | 8/1980 | Weber et al. | 521/51 |
| 4,246,363 | 1/1981 | Turner et al. | 521/163 |
| 4,254,069 | 3/1981 | Dominguez et al. | 264/51 |
| 4,269,945 | 5/1981 | Vanderhider et al. | 521/159 |
| 4,272,618 | 6/1981 | Dominguez et al. | 521/160 |
| 4,296,212 | 10/1981 | Ewen et al. | 528/77 |
| 4,396,729 | 8/1983 | Dominguez et al. | 521/51 |
| 4,433,067 | 2/1984 | Rice et al. | 521/51 |
| 4,444,910 | 4/1984 | Rice et al. | 521/51 |
| 4,474,900 | 10/1984 | Dominguez | 521/110 |
| 4,474,901 | 10/1984 | Dominguez | 521/163 |
| 4,495,081 | 1/1985 | Vanderhider et al. | 521/159 |
| 4,499,254 | 2/1985 | Dominguez et al. | 528/77 |
| 4,523,004 | 6/1985 | Lin et al. | 528/76 |
| 4,530,941 | 7/1985 | Turner et al. | 521/176 |
| 4,578,446 | 3/1986 | House et al. | 528/64 |
| 4,581,387 | 4/1986 | Werner et al. | 521/128 |
| 4,585,850 | 4/1986 | Dominguez | 528/122 |
| 4,607,090 | 8/1986 | Dominguez | 528/48 |
| 4,631,298 | 12/1986 | Presswood | 521/163 |

FOREIGN PATENT DOCUMENTS

081701A1 11/1982 European Pat. Off. .

OTHER PUBLICATIONS

"Textbook of Organic Chemistry," Alexander Gero, John Wiley and Sons, Inc., 1963, p. 11, Sec. 1.10.

_Primary Examiner_—Harold D. Anderson
_Assistant Examiner_—Dennis R. Daley
_Attorney, Agent, or Firm_—Jack H. Park; Kenneth R. Priem

[57] ABSTRACT

The invention is reaction injection molded (RIM) elastomer comprising a cured reaction product of primary or secondary amine terminated polyethers of greater than 1500 molecular weight, an aromatic polyisocyanate, a combination of an unsubstituted aromatic diamine chain extender and a substituted acyclic aliphatic diamine chain extender. The invention is also a method of preparation of a RIM polyurea elastomer as described above.

16 Claims, No Drawings

REACTION INJECTION MOLDED ELASTOMERS PREPARED FROM AMINE TERMINATED POLYETHERS, A BLEND OF AN AROMATIC AMINE TERMINATED CHAIN EXTENDER, A SUBSTITUTED ACYCLIC ALIPHATIC AMINE TERMINATED CHAIN EXTENDER AND AN AROMATIC POLYISOCYANATE

BACKGROUND OF THE INVENTION

1. Field of the Invention

This invention concerns the field of reaction injection molded elastomers.

2. Related Art in the Field

Our U.S. Pat. Nos. 4,254,069 and 4,272,618 concern the curing of RIM polyurethane elastomers. In the glossary of these patents, a "polyol" is defined as a di- or greater functionality high molecular weight alcohol or an amine terminated molecule composed of ether groups. In the discussion of chain extenders in these patents, amines, including aromatic diamines, are disclosed. However, the actual examples are of polyether polyurethanes using polyols (hydroxyl terminated) of high molecular weight. The chain extender, monoethanolamine, was used as a crosslinker.

U.S. Pat. Nos. 4,396,729; 4,444,910 4,333,067 concern elastomers prepared using a high molecular weight amine terminated polyether, an aromatic diamine chain extender and an aromatic polyisocyanate which may merely be a polyisocyanate or a quasi-prepolymer prepared from a polyol reacted with a polyisocyanate wherein some isocyanate groups are still left unreacted. These patents and other related patents state that certain aliphatic amine chain extender materials as disclosed in U.S. Pat. Nos. 4,246,363 and 4,269,945 (see below) may also be used. Various patents have been applied for and received using the basic combination recited above as well as various mold release agents and other additives, for example, catalysts.

European Patent Application No. 81,701A concerns reaction injection molded elastomers. The corresponding U.S. application Ser. No. 443,444, filed 11/22/82, is the subject of interference proceedings with the '729, '910 and '067 patents referred to above (Interference Nos. 101,393; 101,394; and 101,395).

U.S. Pat. No. 3,838,076 discloses foams made from amine terminated polyethers, wherein the amine termination ranges from 10 to 50 percent.

Quillery's U.S. Pat. No. 3,523,918 describes the use of amine chain extenders for the preparation of integral skin foams. Also, Bayer's U.S. Pat. No. 4,218,543 describes the use of high molecular weight polyols, certain aromatic diamines and isocyanates for the production of RIM parts. This Bayer patent specifically claims as a chain extender 1-methyl-3,5-diethyl-2,4-diaminobenzene (diethyltoluenediamine) and its isomer.

U.S. Pat. No. 4,523,004 discloses the substituted aromatic diamine chain extenders of this application in a RIM product.

Turner's U.S. Patent No. 4,246,363 claims a RIM polyurethane composition derived from using at least three different polyols (some are actually amine crosslinkers, both aliphatic and aromatic having specific relationships and reactivity and solubility parameters to one another. Also, Vanderhider's U.S. Pat. No. 4,269,945 claims a process for preparing RIM polyurethanes wherein a relatively high molecular weight hydroxyl containing polyol, a chain extender and a polyisocyanate are used. The chain extender may be an aliphatic amine containing material having at least one primary amine group.

U.S. Pat. No. 4,530,941 discloses reaction molded polyurethanes prepared from a composition comprising (a) a relatively high molecular weight polyol, (b) a chain extender, and (c) a polyisocyanate or polyisothiocyanate improved by replacing a portion of the relatively high molecular weight polyol with an aminated or partially aminated polyoxyalkylene material.

U.S. Pat. No. 4,578,446 discloses the use of an alkyl substituted chain extender wherein the chain extender is used in a polyurethane cast elastomer process.

U.S. Pat. No. 4,631,298 discloses blending various slower reacting chain extenders with diethyltoluene diamine in a RIM system using amine terminated polyethers. Co-pending application Ser. No. 06-926,151 filed 11/3/86 discloses the use of substituted aromatic diamine chain extenders with unsubstituted aromatic diamine chain extenders such as diethyltoluene diamine (DETDA) to slow the reaction rate. The reference to amine chain extenders disclosed in U.S. Pat. Nos. 4,246,363 and 4,269,945 is included also.

Numerous other patents or patent applications disclose and/or claim RIM plastics made with the ingredients of U.S. Pat. No. 4,433,067 plus other ingredients. For example, U.S. Pat. No. 4,474,901, columns 2 and 3, disclose the use of certain low molecular weight aliphatic primary amines. Aliphatics are disclosed in various U.S. Pat. Nos., including 4,585,850 and 4,607,090 as crosslinkers.

SUMMARY OF THE INVENTION

The invention is reaction injection molded (RIM) elastomer comprising a cured reaction product of primary or secondary amine terminated polyethers of greater than 1500 molecular weight, an aromatic polyisocyanate, a combination of an unsubstituted aromatic diamine chain extender and a substituted acyclic aliphatic diamine chain extender. The invention is also a method of preparation of a RIM polyurea elastomer as described above.

DESCRIPTION OF THE PREFERRED EMBODIMENTS

The amine terminated polyethers useful in this invention include primary and secondary amine terminated polyether polyols of greater than 1500 average molecular weight having from 2 to 6 functionality, preferably from 2 to 3, and an amine equivalent weight from about 750 to about 4000. Mixtures of amine terminated polyethers may be used. In a preferred embodiment the amine terminated polyethers have an average molecular weight of at least 2500.

The amine terminated polyether resins useful in this invention are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated, for example, as outlined in U.S. Pat. No. 3,654,370, incorporated herein by reference.

In the practice of this invention, a single high molecular weight amine terminated polyether resin may be used. Also, mixtures of high molecular weight amine terminated polyols such as mixtures of di- and trifunctional materials and/or different molecular weight or different chemical composition materials may be used.

The unsubstituted aromatic chain extenders useful in this invention include, for example, 1-methyl-3,5-diethyl-2,4-diaminobenzene, 1-methyl-3,5 diethyl-2-6-diaminobenzene amine (known as DETDA or diethyltoluene diamine),1,3,5-triethyl-2,6-diaminobenzene, 3,5,3',5'-tetraethyl-4,4'-diaminodiphenylmethane and the like. Particularly preferred aromatic diamine chain extenders are 1-methyl-3,5-diethyl-2,4-diaminobenzene or a mixture of this compound with 1-methyl-3,5-diethyl-2,6-diaminobenzene. By unsubstituted it is meant that the primary amine groups are not substituted.

The substituted acyclic aliphatic amine terminated chain extenders (those not containing ring structures) useful for this invention are secondary amines and include those N,N'-dialkylated aliphatic amines chain extenders picked from those having significantly lower activity than the predominant chain extenders mentioned above. Some of the aliphatic amines falling in this category would include N,N'-dialkylethylenediamine, N,N'-dialkylpropylenediamine, N,N'-dialkylbutylenediamine, and the like. Acrylonitrile adducts of aliphatic diamines may also be employed in the practice of this invention. The slower substituted aliphatic amine chain extender would be used at a concentration, for example, of about 5 to 25%, of the total chain extender combination. It is especially preferred to use as the substituted aliphatic chain extender N,N'-ditertiarybutyl ethylenediamine.

The above exemplified chain extenders are not to be construed as conclusive of all acceptable substituted aliphatic diamine chain extenders falling within the scope of this invention. They are merely given as examples. Those skilled in the art will readily see that there are other substituted aliphatic diamine chain extenders which will have the effect noted in the examples which follow. Therefore, it is within the ability of those skilled in the art to identify equivalent substituted aliphatic amine chain extenders without departing from the scope of this invention.

Chain extenders such as DETDA react very rapidly and produce premature gelling, and consequently densification at the mold inlet. It was surprising that only a minor amount of substituted aliphatic chain extender blended with DETDA had a dramatic effect on the reaction speed and eliminated the premature gelling but still made RIM parts with good properties.

The ratio of unsubstituted aromatic diamine chain extenders to the substituted aliphatic amine chain extenders may vary depending on the other reactive ingredients in the formulation. Those skilled in the art will recognize that it is within their skill to blend these chain extenders to achieve a balance between speed of reaction and part properties. When a proper blend is achieved, the reaction will be fast enough to produce parts at a rapid rate but not so fast as to produce premature gelling and densification at the inlet of the mold known as the injection point. Thus, a proper balance of these two types of chain extenders will produce parts with excellent properties as well as having improved processing characteristics.

A wide variety of aromatic polyisocyanates may be used here. Typical aromatic polyisocyanates include p-phenylenediisocyanate, 2,6-toluenediisocyanate, dianisidinediisocyanate, bitolylenediisocyanate, naphthalene-1,4-diisocyanate, bis(4-isocyanatophenyl) methane, bis(3-methyl-3-isocyantophenyl)methane, bis(3-methyl-4-isocyanatophenyl)methane, and 4,4'-diphenylpropanediisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No, 3,362,979, issued January 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pur MDI is included also. This product is made by heating pure distilled MDI in the presence of a catalyst. The liquid product is a mixture of pure MDI and modified MDI is described in U.S. Pat. No. 4,433,067. Examples of commercial materials of this type are Dow's ISONATE ® 125M (pure MDI) and ISONATE 143L ("liquid" MDI). Preferably the amount of isocyanates used is the stoichiometric amount based on all the ingredients in the formulation or greater than the stoichiometric amount.

Of course, the term polyisocyanate also includes quasi-prepolymers of polyisocyanates with active hydrogen containing materials.

As mentioned above, additional catalysts are not necessary for the practice of this invention. In a preferred embodiment of our invention no added catalysts are employed.

Other conventional formulation ingredients may be employed as needed such as; for example, foam stabilizers or emulsifiers.

Reinforcing materials, if desired, useful in the practice of our invention are known to those skilled in the art. For example, chopped or milled glass fibers, chopped or milled carbon fibers and/or other mineral fibers are useful.

Of course, internal mold release agents may be employed. Zinc stearate is known. U.S. Pat. No. 4,396,729 discloses mold release agents in general as well as dimethyl siloxane with organic acid groups.

Post curing of the elastomer of the invention is optional. Post curing will improve some properties such as heat sag. Employment of post curing depends on the desired properties of the end product.

The examples which follow exemplify this invention. However, these examples are not intended to limit the scope of the invention.

EXAMPLE 1

JEFFAMINE® T-5000 (70.5 pbw), diethyltoluene diamine (28.0 pbw), and zinc stearate (1.75 pbw) were charged into the B-component working tank of the Cincinnati Milacron RIM machine. Recirculation temperature was set at 117° F. Quasi-prepolymer A (94.4 pbw) was charged into the A-component tank and the temperature of this component was adjusted to 124° F. The components were injected into a production-type fascia tool which was preheated to 162° F. Total shot weight was 6.75 lbs. At a 6-lb/sec injection rate, the part showed some density gradient around the point of injection. A 2 ft. x 2 ft.×0.125 inch plaque was also injected at a rate of 3-lb/sec (2.95 lb shot). This plaque was used to determine physical properties.

EXAMPLE 2

JEFFAMINE T-5000 (70.5 pbw), diethyltoluene diamine (28.0 pbw), N,N'-di-t-butyl ethylenediamine (Di-t-BuEDA) (1.4 pbw) and zinc stearate (1.75 pbw) were charged into the B-component working tank of the Cincinnati Milacron RIM machine. Recirculation temperature was set at 119° F. Quasi-prepolymer A (98.8 pbw) was charged into the A-component tank and the temperature of this component was adjusted to 125° F. The components were injected into a production-type fascia tool which was preheated to 162° F. Total shot weight was 6.75 lbs. At a 5-lb/sec injection rate, the part looked similar to that of Example 1, which was shot at 6-lb/sec. A flat plaque was also prepared in a similar manner to Example 1.

EXAMPLE 3

JEFFAMINE T-5000 (70.5 pbw), diethyltoluene diamine (28.0 pbw), N,N'-di-t-butyl ethylenediamine (4.2 pbw) and zinc stearate (1.75 pbw) were charged into the B-component working tank of the Cincinnati Milacron RIM machine. Recirculation temperature was set at 119° F. Quasi-prepolymer A (107.5 pbw) was charged into the A-component tank and the temperature of this component was adjusted to 112° F. The components were injected into a production-type fascia tool which was preheated to 162° F. Total shot weight was 6.75 lbs. At a 4.5-lb/sec injection rate, the part looked similar to that of Example 1, which was shot at 6-lb/sec. A flat plaque was also prepared in a similar manner to Example 1.

TABLE 1

| Example No. | 1 | 2 | 3 |
| --- | --- | --- | --- |
| pbw of Di-t-BuEDA | 0 | 1.4 | 4.2 |
| Tensile, pli | 2800 | 2630 | 2530 |
| Tear, psi | 390 | 450 | 390 |
| Ultimate elongation, % | 175 | 180 | 170 |
| Flexural modulus, psi | | | |
| −20° F. | 83200 | 78100 | 81800 |
| 77° F. | 37300 | 36600 | 40000 |
| 158° F. | 29300 | 27900 | 30000 |
| Heat sag, mm 250° F., 150 mm overhang | 11.3 | 19.5 | 19.2 |
| Min. injection time, sec | 1.1 | 1.35 | 1.5 |

The above data indicate that significantly longer injection times can be obtained by the addition of N,N,-ditertiarybutyl ethylenediamine to the B-component without seriously affecting properties.

| GLOSSARY OF TERMS AND MATERIALS | |
| --- | --- |
| ISONATE ® 143L | Carbodiimide modified liquid MDI, a product of the Dow Chemical Co. |
| JEFFAMINE ® T-5000 | Polypropylene oxide triamine of about 5,000 molecular weight |
| DETDA | Diethyltoluene diamine, a product of Ethyl Corp. |
| THANOL ® SF-5505 | A 5,500 molecular weight polyether triol containing approximately 80% primary hydroxyl groups. |
| Quasi-prepolymer A | A quasi-prepolymer prepared by reacting THANOL ® SF-5505 (40 pbw) with ISONATE ® 143L (60 pbw). |

We claim:

1. A reaction injection molded elastomer made by reacting in a closed mold amine terminated polyethers of at least 1,500 molecular weight and having a functionality of from about 2 to 3, having greater than 50% of their active hydrogens in the form of amine hydrogens, a blend of an unsubstituted aromatic amine termianted chain extender and a N/N'-dialkylated aliphatic amine chain extender, and an aromatic polyisocyanate.

2. An elastomer as in claim 1 where the percent of N,N'-dialkylated aliphatic amine chain extender to total chain extender ranges from about 5 to 25%.

3. A reaction injection molded elastomer made by reacting in a closed mole amine terminated polyethers of at least 2500 molecular weight and having a functionlity of from about 2 to 3, having greater than 50% of their active hydrogens in the form of amine hydrogens, a blend of an unsubstituted aromatic amine terminated chain extender and a N,N'-dialkylated aliphatic amine chain extender, and an aromatic polyiaocyanate.

4. An elastomer as in claim 3 where the percent of N,N'-dialkylated aliphatic amine chain extender to total chain extender ranges from about 5 to 25%.

5. A reaction injection molded elastomer made by reacting in a closed mold amine terminated polyethers of at least 5000 molecular weight and having a functionality of from about 2 to 3, having greater than 50% of their active hydrogens in the form of amine hydrogens, a blend of an unsubstituted aromatic amine terminated chain extender and a N,N'-dialkylated aliphatic amine chain extender, and an aromatic polyisocyanate.

6. An elastomer as in claim 5 where the percent of N,N'-dialkylated aliphatic amine chain extender to total chain extender ranges from about 5 to 25%.

7. A method of making a reaction injection molded elastomer comprising reacting in a closed mold amine terminated polyethers of at least 1500 molecular weight and having a functionality of from about 2 to 3, having greater than 50% of their active hydrogens in the form of amine hydrogens, a blend of an unsubstituted aromatic amine terminated chain extender and a N,N'-dialkylated aliphatic amine chain extender, and an aromatic polyisocyanate.

8. A method as in claim 7 where the percent of N,N'-dialkylated aliphatic amine chain extender to total chain extender ranges from about 5 to 25%.

9. A method for making a reaction injection molded elastomer comprising reacting in a closed mold amine terminated polyethers of at least 2500 molecular weight and having a functionality of from about 2 to 3, having greater than 50% of their active hydrogens in the form of amine hydrogens, a blend of an unsubstituted aroamtic amine terminated chain extender and a N,N'-dialkylated aliphatic amine chain extender, and an aromatic polyisocyanate.

10. A method as in claim 9 where the percent of N,N'-dialkylated aliphatic amine chain extender to total chain extender ranges from about 5 to 25%.

11. A method for making a reaction injection molded elastomer comprising reacting in a closed mold amine terminated polyethers of at least 5,000 molecular weight and having a functionality of from about 2 to 3, having greater than 50% of their active hydrogen in the form of amine hydrogens, a blend of an unsubstituted aromatic amine terminated chain extender and a N,N'-dialkylated aliphatic amine chain extender, and an aromatic polyisocyanate.

12. A method as in claim 11 where the percent of N,N'-dialkylated aliphatic amine chain extender to total chain extender ranges from about 4:1 to 20:1.

13. A method for maddDd a deaction injection molded elastomer comprising reacting in a closed mold amine terminated polyethers of at least 1500 molecular weight and having a functionality of from about 2 to 3, having greater than 50% of their active hydrogens in the form of amine hydrogens, a blend of diethyltoluene diamine and N,N'-ditertiarybutyl ethylenediamine, and an aromatic polyisocyanate.

14. A method for making a reaction injection molded elastomer comprising reacting in a closed mold amine terminated polyethers of at least 2500 molecular weight and having a functionality of from about 2 to 3, having greater than 50%, of their active hydrogens in the form of amine hydrogens, a blend of diethyltoluene diamine and and N,N'-ditertiarybutyl ethylenediamine, and an aromatic polyisocyanate.

15. A reaction injection molded elastomer produced from the step comprising reacting in a closed mold amine terminated polyethers of at least 1500 molecular weight and having a functionality of from about 2 to 3, having greater than 50% of their active hydrogens in the form: of amine hydrogens, a blend of diethyltoluene diamine and N,N'-ditertiarylbutyl ethylenediamine, and an aromatic polyisocyanate.

16. A method for making a reaction injection molded elastomer comprising reacting in a closed mold amine terminated polyethers of at least 5000 molecular weight and having a functionality of from about 2 to 3, having greater than 50d of their active hydrogens in the form of amine hydrogens, a blend of diethyltoluene diamine and N,N'-ditertiarybutyl ethylenediamine, and an aromatic polyisocyanate.

* * * * *